US009485690B2

(12) United States Patent
Cucala Garcia et al.

(10) Patent No.: US 9,485,690 B2
(45) Date of Patent: Nov. 1, 2016

(54) SYSTEM FOR CONNECTING RADIO ACCESS NODES OF A RADIO ACCESS NETWORK

(75) Inventors: Luis Cucala Garcia, Madrid (ES); Primitivo Matas Sanz, Madrid (ES); Quiliano Perez Tarrero, Madrid (ES); Francisco Javier Lorca Hernando, Madrid (ES)

(73) Assignee: Telefonica, S.A., Madrid (ES)

( * ) Notice: Subject to any disclaimer, the term of this patent is extended or adjusted under 35 U.S.C. 154(b) by 415 days.

(21) Appl. No.: 14/116,821

(22) PCT Filed: May 16, 2012

(86) PCT No.: PCT/EP2012/059201
§ 371 (c)(1),
(2), (4) Date: Jan. 27, 2014

(87) PCT Pub. No.: WO2012/156482
PCT Pub. Date: Nov. 22, 2012

(65) Prior Publication Data
US 2014/0155075 A1   Jun. 5, 2014

(30) Foreign Application Priority Data

May 17, 2011 (ES) .................................. 201130794

(51) Int. Cl.
*H04W 28/26* (2009.01)
*H04W 16/16* (2009.01)
*H04W 88/08* (2009.01)

(52) U.S. Cl.
CPC .............. *H04W 28/26* (2013.01); *H04W 16/16* (2013.01); *H04W 88/085* (2013.01)

(58) Field of Classification Search
CPC . H04W 16/16; H04W 28/26; H04W 88/085; H04W 16/32; H04W 16/24; H04W 84/02; H04W 84/10; H04W 84/12; H04W 84/22; H04W 92/04; H04W 16/20; H04W 16/18; H04W 88/02; H04W 4/02; H04W 88/06; H04W 88/08; H04W 48/16; H04W 48/18; H04W 48/20; H04W 28/02; H04W 28/10; H04W 72/04; H04W 76/02; H04W 16/10; H04W 52/244; H04W 52/26
See application file for complete search history.

(56) References Cited

U.S. PATENT DOCUMENTS 5,918,154 A    6/1999  Beasley
8,682,338 B2*  3/2014  Lemson ............... H03F 1/3247
                                                       455/453

(Continued)

FOREIGN PATENT DOCUMENTS

WO    2009/149101 A1   12/2009

OTHER PUBLICATIONS

Jonathan Gambini et al., "Radio over Telephone Lines in Femtocell Systems", 21st Annual IEEE International Symposium on Personal, Indoor and Mobile Radio Communications, Sep. 26, 2010, pp. 1544-1549.

(Continued)

*Primary Examiner* — Meless Zewdu
(74) *Attorney, Agent, or Firm* — Sughrue Mion, PLLC (57) ABSTRACT

The system comprises a plurality of radio access nodes, or cells, each of said cells providing a coverage area to a plurality of user equipments, characterized in that each of said radio access nodes is splitted into:
a common processing section (1) which performs a main processing stage; and
a plurality of remote transceiving sections (2a, 2b, 2c), each performing a local processing stage complementing said main processing stage, being operatively connected to said common processing section, and constituting a sub-cell providing a coverage sub-area, wherein said coverage area is distributed into said coverage sub-areas.

The method is arranged for carrying out said splitting of radio access nodes.

6 Claims, 6 Drawing Sheets

(56) References Cited

U.S. PATENT DOCUMENTS

| | | | |
|---|---|---|---|
| 2002/0123365 A1* | 9/2002 | Thorson | H04W 88/08 455/524 |
| 2009/0286510 A1* | 11/2009 | Huber | G06Q 20/1235 455/410 |
| 2011/0086614 A1* | 4/2011 | Brisebois | H04K 3/42 455/411 |
| 2011/0096736 A1 | 4/2011 | Kwon et al. | |
| 2013/0252602 A1* | 9/2013 | Meshkati | H04W 24/02 455/422.1 |
| 2014/0004865 A1* | 1/2014 | Bhargava | B01D 46/50 455/445 |
| 2014/0072299 A1* | 3/2014 | Stapleton | H04B 10/25754 398/45 |
| 2014/0162664 A1* | 6/2014 | Stapleton | H04W 24/02 455/445 |
| 2015/0063098 A1* | 3/2015 | Yavuz | H04W 24/02 370/229 |

OTHER PUBLICATIONS

International Search Report of PCT/EP2012/059201 dated Aug. 16, 2012.

* cited by examiner

SYSTEM FOR CONNECTING RADIO ACCESS NODES OF A RADIO ACCESS NETWORK

CROSS REFERENCE TO RELATED APPLICATIONS

This is a National Stage of International Application No. PCT/EP2012/059201 filed May 16, 2012, claiming priority based on Spanish Patent Application No. P201130794 filed May 17, 2011, the contents of all of which are incorporated herein by reference in their entirety.

FIELD OF THE ART

The present invention generally relates, in a first aspect, to a system for minimizing interferences between radio access nodes, or cells, of a radio access network, and more particularly to a system which comprises splitting said radio access nodes into a common processing section and a plurality of remote transceiving sections.

A second aspect of the invention relates to a method arranged for carrying out said splitting of radio access nodes.

PRIOR STATE OF THE ART

Femtocells are small base stations that are installed at the customer's or enterprise's premises in order to provide mobile broadband coverage, like UMTS or LTE, in a limited area. The femtonodes are connected to the mobile operator's core network by means of a fixed broadband access network, like an ADSL line or a fibre connection.

The current femtonode integrates all its functionalities within a single enclosure, from the antennas which radiate the radio signals to the Ethernet connection which supports the interface with the mobile core network (Iuh in the case of UMTS, or S1 in the case of LTE). This single-enclosure femtonode must provide the full coverage of a home or an office area, and if its coverage is not enough, its power must be increased or more femtonodes must be installed.

There are also some other solutions for providing indoor coverage in a distributed way. For example:

Radio On Fibre (RoF) techniques. In this case a single base station is installed in a building, and the radio signals, before their transmission through the antennas, are converted to an optical format and transmitted through a fibre network along the building. At the other end of the fibre network, some remote radio heads re-convert the signals to the radio format and radiate them by means of antennas.

Radio on coaxial cable media. In this case a single base station is installed in a building, and the radio signals are transmitted through a coaxial cable network along the building up to some remote radio heads. This remote radio heads can be fully passive, or they can include some active elements. Some examples of coaxial cable solutions with active elements are described in patents "WO2009149101A1 Remote Distributed Antenna" and "U.S. Pat. No. 5,918,154A Communications Systems Employing Antenna Diversity".

Remote radio heads connected to the base station by means of a digital interface. The main representatives of this solution are the CPRI and the OBSAI standards. In both cases the digital I/Q signals of the base station, before they are converted to an analog format and up-converted to radiofrequency, are digitally transmitted through a fibre network. At the other end of the fibre network, some remote radio heads convert the signals to analog and perform the final frequency up-conversion, and radiate them by means of antennas.

Regarding the implementation of a femtonode, the 3GPP standard does not specify any reference architecture for it. However, the generation of both the downlink and the uplink physical signals makes it necessary to implement a set of functional blocks.

In the downlink, the payload to be transmitted to the UE's goes through the standard process in LTE; a code block segmentation, channel coding, rate matching and code block concatenation. The result is a set of Codewords, and every Codeword is a set of user data before their formatting for radio transmission.

Once every Codeword has been generated, it goes through the standard LTE scrambling process and the modulation mapper. The function of the modulation mapper is mapping groups of bits to complex modulated symbols according to a predefined modulation scheme. The modulation scheme can be QPSK, 16-QAM or 64-QAM. In the conventional architecture, the modulated segments are represented by means of complex symbols, whose real and imaginary parts are represented by means of digital words that range from 8 to 14 bits. This is the same number of bits that are used in the DAC that is placed after the IFFT block that is included in the OFDM signal mapper.

In the standard LTE MU-MIMO architecture, the result of this scrambling and modulation mapper process is fed to the Layer Mapper block, whose function is to divide a Codeword between two or more layers, up to four, and every layer is fed to an antenna. After the layer mapping block, MIMO Precoding is performed.

The Resource Element Mapper is placed after the MIMO precoding block, mapping the set of complex symbols to a set of subcarriers, and the OFDM signal mapper performs the OFDM signal modulation by means of an IFFT.

Finally, a Cyclic Prefix is added to the OFDM signal, a digital to analog (DAC) conversion is performed, and the analog signal is up-converted to radiofrequency before transmission.

In the Uplink, the receiving antenna detects the uplink signal from the user terminal, which is down-converted, I/Q demodulated and converted to a digital format by means of an Analog to Digital Converter. The Cyclic Prefix Removal block removes the Cyclic Prefix from the SC-FDMA signal, and the FFT and the IFFT blocks perform the SC-FDMA demodulation. The Resource Element Demapper extracts the modulated symbols from the set of assigned subcarriers. The function of Demodulation Demapper block is the opposite of the Modulation Mapper, i.e. to convert QPSK, 16-QAM or 64QAM symbols into a serial stream of binary digital words which is fed to the descrambler and decoding units.

Problems with Existing Solutions

The main problem of the Radio On Fibre (RoF) or the Radio on Coaxial cable techniques is that they are very costly and can only be used in very big buildings which demand a high radio capacity.

In the case of the Remote radio heads connected to the base station by means of a digital interface, like CPRI or OBSAI standards, the main problems of this solution are two: the data rate that must be supported by the fibre network is high, with a minimum bit rate of the order of 300 Mbps, and that it is very costly and can only be used in very big buildings which demand a high radio capacity.

The main problem of the current femtonodes is the interference, which can be produced between the femtonodes and the overlying mobile broadband macro layer, or between the femtonodes themselves, and a lot of effort is being devoted to address it [1], [2], [3], [4].

The interference happens when the femtonodes and the macro layer share the same frequency band, which is very common due to the limited availability of bandwidth. There are some scenarios for the interference problem:

1. When the femtonodes operate in the so called Closed Subscriber Group mode (CSG) [5] [6]. In this case a User Equipment (UE), i.e. a mobile phone, which is not included in the CSG list of a femtonode will not be able to camp in it, and thus the UE will perceive the femtonode signal as an interference that partially blocks the wanted signal coming from the macrocell layer.

2. When the femtonodes do not operate in the Closed Subscriber Group mode and thus any UE can camp in it, the coverage area of the femtonodes can overlap between them, or can overlap the coverage area of the macrocell layer. In the overlapping area, some physical channels of the mobile broadband signal emitted by every femtonode and which are always present, for example the Broadcast Channel, will interfere between them.

3. When the femtonodes do not operate in the Closed Subscriber Group mode and thus any UE can camp in it, the coverage area of the femtonodes can overlap between them, or can overlap the coverage area of the macrocell layer. In the overlapping area, the channels that are dedicated for the user data communication from a wanted femtonode can be simultaneously used by another unwanted femtonode. In UMTS this means that a channelization code used by a femtonode to communicate data to a UE equipment is also used by a neighboring femtonode. In LTE this means that the UE will report the status of the radio interface usage by means of a Channel Quality Indicator (CQI), and that the radio resource assignment scheduler in its serving femtonode will try to cope with the interference from an unwanted femtonode but it will not always be possible to achieve it.

These interference scenarios are always the result of two fundamental limitations of the current femtonodes:

1. The femtonodes cannot communicate with each other or with the macrocells, in order to coordinate its use of the radio resource.

2. The femtonodes output power, which is enough to cover a home or an office area, is high enough to provide a coverage area that overlaps with that of the macrocells or with other femtonodes.

DESCRIPTION OF THE INVENTION

It is necessary to offer an alternative to the state of the art which covers the gaps found therein, particularly related to the lack of proposals which really allow avoiding interferences between femtonodes or between femtonodes and the macrocell layer.

To that end, the present invention provides, in a first aspect, a system for minimizing interferences between radio access nodes of a radio access network, said radio access network comprising a plurality of radio access nodes, or cells, each of said cells providing a coverage area to a plurality of user equipments.

On contrary to the known proposals, the system of the invention, in a characteristic manner it further comprises, in order to distribute the coverage area of a single cell into many very small cells, splitting said radio access nodes into:

a common processing section which performs a main processing stage; and a plurality of remote transceiving sections, each performing a local processing stage complementing said main processing stage, being operatively connected to said common processing section, and constituting a sub-cell providing a coverage sub-area, wherein said coverage area is distributed into said coverage sub-areas.

Other embodiments of the method of the first aspect of the invention are described according to appended claims, and in a subsequent section related to the detailed description of several embodiments.

A second aspect of the present invention comprises a method for minimizing interferences between radio access nodes of a radio access network, said radio access network comprising a plurality of radio access nodes, or cells, each of said cells providing a coverage area to a plurality of user equipments.

On contrary to the known proposals, the method of the invention, in a characteristic manner, comprises splitting each of said radio access nodes into:

a common processing section for performing a main processing stage; and a plurality of remote transceiving sections, for performing each a local processing stage complementing said main processing stage, wherein each of said remote transceiving sections constitutes a sub-cell providing a coverage sub-area, wherein said coverage area is distributed into said coverage sub-areas.

Other embodiments of the second aspect of the invention are described according to appended claims, and in a subsequent section related to the detailed description of several embodiments.

BRIEF DESCRIPTION OF THE DRAWINGS

The previous and other advantages and features will be more fully understood from the following detailed description of embodiments, with reference to the attached drawings, which must be considered in an illustrative and non-limiting manner, in which.

DETAILED DESCRIPTION OF SEVERAL EMBODIMENTS

The goal of this invention is to distribute the coverage area of a single femtonode into many very small cells, every one of them as small as a single room. In this way the chances that the coverage area of a femtonode overlaps with other femtonodes, or overlaps with the macrocell layer, are greatly reduced. For this purpose the femtonode is split into two sections, a Processing Section (1) and a set of Remote Sections (2a, 2b, 2c), which are inter-connected by means of a low bit rate communications network.

The Processing Section performs all the data processing functionalities of a femtonode, from the Radio Resource Control (RRC) layer to the Modulation Mapper of the Physical Layer (PHY), including the support of the S1 and X2 interfaces in LTE, or the Iuh interface in UMTS.

On the other hand, the Remote Section performs the Physical Layer functionalities included between the Modulation Mapper and the antenna, including from subcarrier modulation to radiofrequency transmission and reception.

Both sections can be physically separated and interconnected by means of some communications infrastructure, like an Ethernet LAN or a Power Line Communications (PLC) network. This communications infrastructure supports digital data as is the case of the present proposal.

The split of the femtonode into two sections is done across the Modulation Mapper in order to ensure that the bit rate to be transmitted between the Processing Section and a Remote Section is low enough, of the order of some tens of Mbps to be supported by an Ethernet LAN or PLC network. This is possible thanks to the fact that before the Modulation Mapper the data is fed by means of Codewords, represented by discrete values that are not yet converted to the full scale of the subsequent Digital to Analog Converters (DAC).

Once the Modulation Mapping has been done in the Remote Section, its output values, a block of complex-valued symbols, are then represented by digital words with the same number of bits (from 8 to 14) than the DAC that will be used before the analog radio section, which greatly increases the bit rate (from 8 to 14 times) at the output of the Modulation Mapper, but this data stream remains confined to within the Remote Section.

This low bit rate between the Processing Section and the Remote Section is the main difference with respect to other implementations that make use of some kind of remote radio units, like CPRI [7] or OBSAI [8], which typically require bit rates in excess of 300 Mbps that cannot be supported by many Ethernet LAN's or PLC networks.

Figure 1:
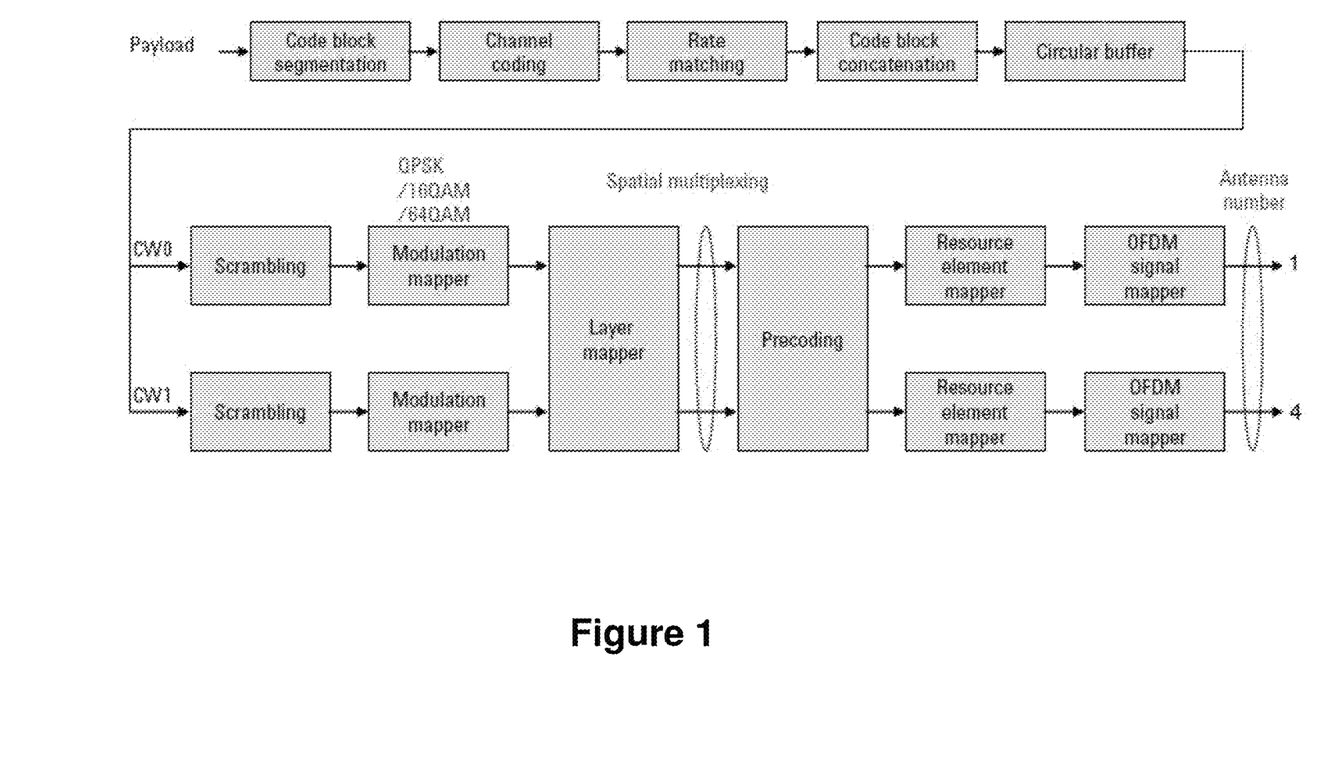
FIG. 1 shows the functional blocks for current standard LTE downlink signal generation.

This invention makes it possible to connect many Remote Sections to a single Processing Section, and every Remote Section can be placed in a different location or room to provide LTE coverage around it, as shown in FIG. 1. The output power of every Remote Section can be adjusted individually and can be set to very low values, of the order of −10 dBm, in order to provide coverage to a very limited area and avoiding overlapping with the coverage from another Remote Sections. The limited coverage of every Remote Section allows reusing the radio spectrum in different Remote Sections, thus applying the radio cellular concept to very small cells.

Figure 2:
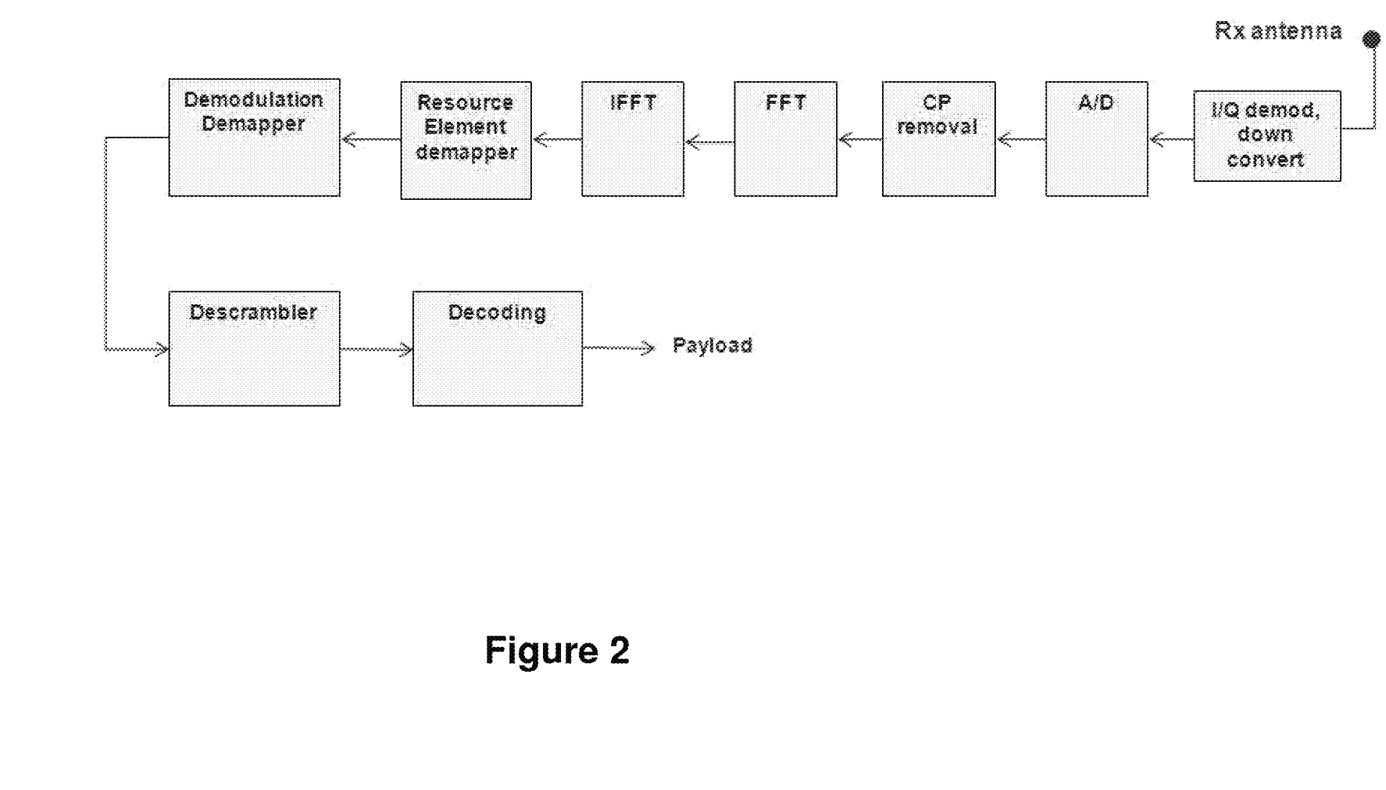
FIG. 2 shows the functional blocks for current standard LTE uplink signal generation.
Figure 3:
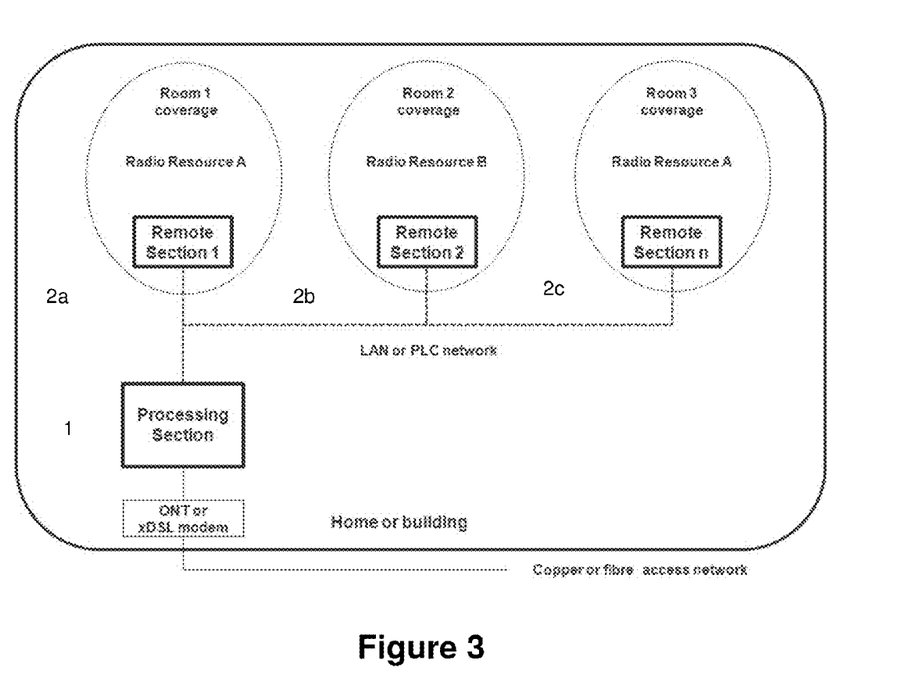
FIG. 3 shows, according to an embodiment of the system proposed in the invention, a single processing section and multiple remote sections for providing LTE coverage.

The architecture of the Processing Section and the Remote Section are very similar to that of a standard HeNB. The Processing Section updates the standard Multiple User MIMO (MU-MIMO) architecture, making use of as many data streams or payloads as User Equipments, devoting every data stream or payload to a single antenna and thus to a single Remote Section. In the standard MU-MIMO architecture as defined in 3GPP (as shown in FIG. 2) two Codewords are possible, which are mapped to up to four antennas, in a one-to-many configuration. In this invention the number of data streams or payloads is not limited, as it is not the number of antennas (equivalent to the number of Remote Sections), and there is a one-to-one correspondence between one data stream or payload and a single antenna or Remote Section (as shown in FIG. 3), and a Remote Section can support more than one data stream or payload.

All through this invention description the femtonode concept can be applied to an UMTS femtonode or HNB (Home Node B in 3GPP terminology), or to an LTE/LTE-A femtonode or HeNB (Home eNode B in 3GPP terminology). However, the preferred embodiment of the invention which will be described in this patent application will be based in a HeNB.

Also all through this invention the concept of radio resource refers in UMTS to a specific combination of scrambling code and channelization code used in a given instant, and in LTE to a set of OFDM subcarriers used in a given instant.

This invention splits the femtonode into two sections, a Processing Section (1) and a set of Remote Sections (2a, 2b, 2c), which are inter-connected by means of a local communications network, wired or wireless, for example but not precluding any other implementation, an Ethernet Local Area Network, a Power Line Communications network or a wireless link.

This split is done in order to install low power transmitting units, the Remote Sections, in those rooms which require UMTS or LTE/LTE-A radio coverage, having every Remote Section devoted to provide coverage to only that single room, and keeping most of the processing functionalities of the femtonode in the Processing Section.

The Processing Section performs all the data processing functionalities of a femtonode, from the Radio Resource Control (RRC) layer to just before the Modulation Mapper of the Physical Layer (PHY), including the support of the S1 and X2 interfaces.

The Processing Section is basically a complete femtonode, from which the following blocks have been removed:

In the downlink transmission chain (the transmission that goes from the femtonode to the UE), all the functional blocks between the Modulation Mapper and the transmitting antenna have been removed.

In the uplink reception chain (the transmission that goes from the UE to the femtonode), all the functional blocks between the receiving antenna and the Demodulation Demapper (conversion of symbols to bits) have been removed.

The concepts of Modulation Mapper and Demodulation Demapper are standard in LTE. The Modulation Mapper assigns groups of bits to complex modulated symbols according to a modulation mode (e.g. QPSK, 16QAM or 64QAM), and the Demodulation Demapper performs the opposite function.

Figure 4:
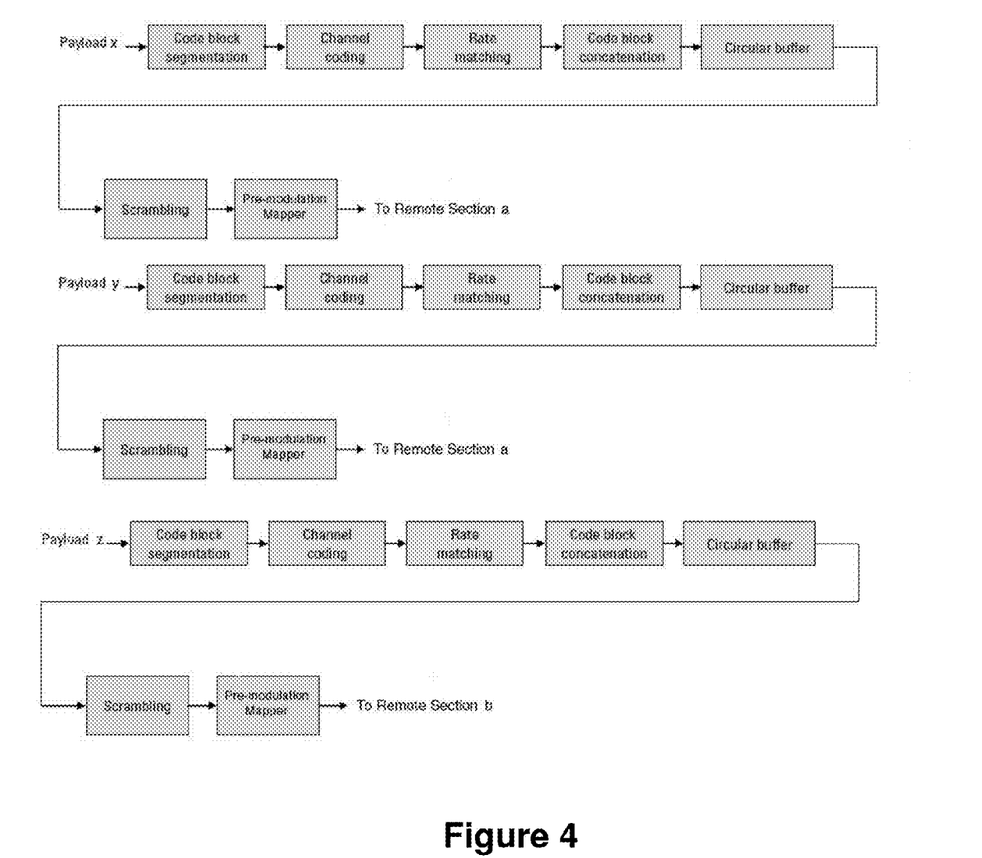
FIG. 4 shows, according to an embodiment of the system proposed in the invention, the downlink distributed femtonode processing section.

The downlink Processing Section makes use of as many data streams or payloads as User Equipments, devoting every data stream or payload to a single antenna and thus to a single Remote Section. In this invention the number of data streams or payloads is not limited, as it is not the number of antennas (equivalent to the number of Remote Sections), and every data stream or payload is directed to a single antenna or Remote Section, and more than one data stream or payload can be directed to a Remote Section (as shown in FIG. 4).

In the downlink part of the Processing Section, the payload to be transmitted to the UE's goes through the standard process in LTE, from code block segmentation, channel coding, rate matching and code block concatenation. The result is a set of Codewords, and every Codeword is a set of user data before their formatting for radio transmission. In this invention every Codeword is devoted to a single UE, and thus the MU-MIMO Layer Mapping and Precoding functionalities are not necessary. Once every Codeword has been generated, it goes through the standard LTE scrambling process.

In a conventional architecture, the scrambled Codeword would be fed to the Modulation Mapper, whose function is to map groups of bits to complex modulated symbols according to a predefined modulation scheme. In this invention the Modulation Mapper is located in the Remote Section. The output of the scrambler is fed to a Pre-Modulation Mapper block, which adds some bits of information to the output of the scrambler, that indicate:

The type of modulation that will have to be applied to the segment in the Modulation Mapper at the Remote Section.

The initial Resource Block where data will be mapped in the Resource Element Mapper at the Remote Section.

The number of Resource Blocks which are reserved to the intended User Equipment.

The output of the Pre-Modulation Mapper is then fed to the local communications network to be transmitted to the Remote Sections.

Additionally, other control information must also be sent to the Remote Sections: the Physical Broadcast Channel (PBCH), the Physical Downlink Control Channel (PDCCH), the Physical Multicast Channel (PMCH), the Physical Control Format Indicator Channel (PCFICH), and the Physical Hybrid Automatic Repeat Request Indicator Channel (PHICH). These channels have a much lower bit rate, and thus the total bit rate is mainly determined by the payload.

The uplink subsection of the Processing Section receives the output of the Demodulation Demapper of the Remote Section, after its transmission through the local communications network. In LTE the information bits shall correspond to PUSCH, PUCCH and PRACH channels, being PUSCH the one with the highest bit rate and that which mainly determines the total bit rate.

Figure 5:
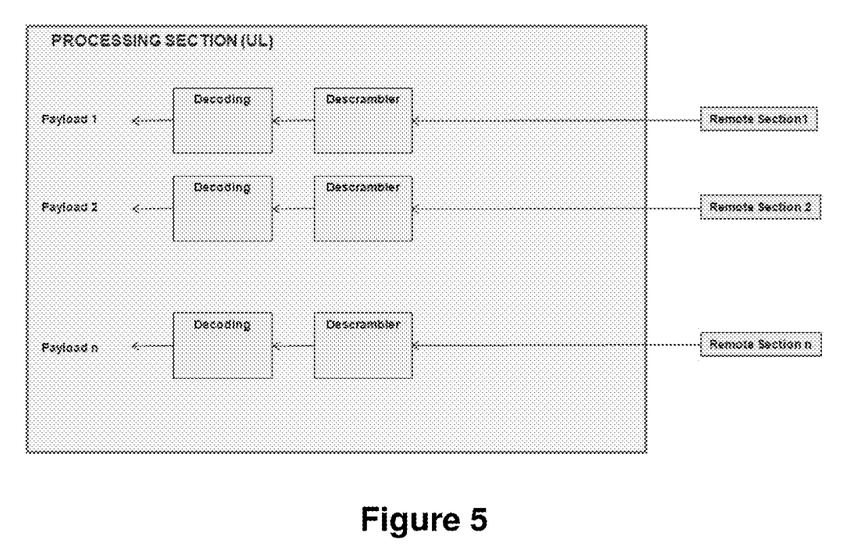
FIG. 5 shows, according to an embodiment of the system proposed in the invention, the uplink distributed femtonode processing section.

Every data from every Remote Section is descrambled and decoded, and the output of every decoder is fed to the subsequent uplink blocks of a standard femtonode, as shown in FIG. 5.

Figure 6:
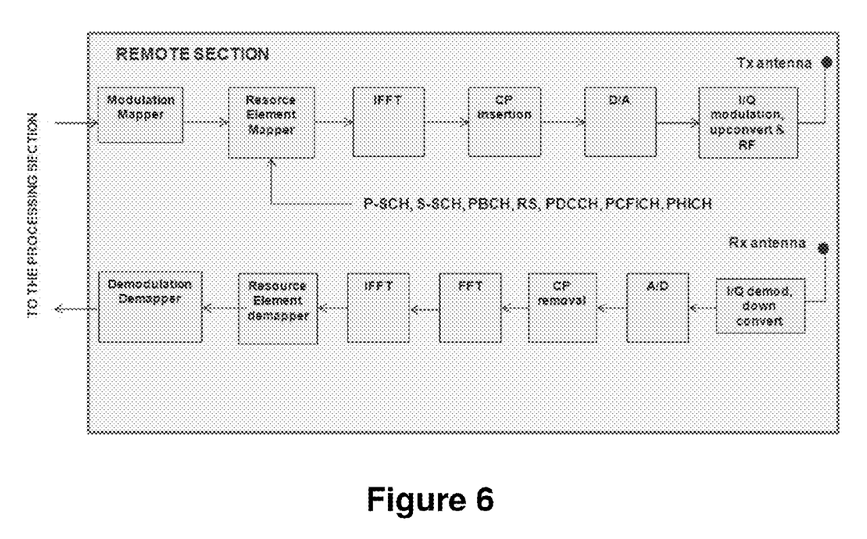
FIG. 6 shows, according to an embodiment of the system proposed in the invention, the whole remote section.

The Remote Section includes the remaining femtonode functionalities that are not included in the Processing Section. The architecture of the Remote Section was shown in FIG. 6.

In the Downlink, it includes all the functions between the Modulation Mapper and the transmitting antenna, performing the standard LTE OFDMA modulation. The Modulation Mapper receives the output of the Pre-Modulation Mapper of the Processing Section, after being transmitted through the local communications network. The Modulation Mapper maps the data segments into OFDM subcarriers, applies the modulation scheme (e.g. QPSK, 16 QAM, 64 QAM), and represents the modulated segments by means of complex symbols, whose real and imaginary parts are represented by means of digital words that range from 8 to 14 bits.

The output of the Modulation Mapper is a parallel stream which is fed to the Resource Element Mapper. The Resource Element Mapper adds all the common channels that must be transmitted from the Remote Section: the Primary Synchronization Channel (P-SCH), the Secondary Synchronization Channel (S-SCH), the Physical Broadcast Channel (PBCH), the Reference Signals (RS), the Physical Downlink Control Channel (PDCCH), the Physical Control Format Indicator Channel (PCFICH), and the Physical Hybrid ARQ Indicator Channel (PHICH).

The output of the Resource Element Mapper is a parallel stream which is fed to the IFFT block. The output of the IFFT block is a stream of OFDM symbols, to which cyclic prefixes (CP) are added in the CP Insertion block. The output of the CP Insertion block is fed to a Digital to Analog Converter (DAC or D/A), whose output is a baseband or intermediate frequency analog signal. This analog signal is I/Q modulated, up-converted to the desired radiofrequency and radiated through the transmitting antenna.

In the Uplink, the Remote Section includes all the standards functions between the receiving antenna and the Demodulation Demapper, performing the standard LTE SC-FDMA demodulation. For the Remote Sections to successfully extract the data from the uplink radio signal, additional information must be provided by the Processing Section:

The type of modulation in uplink.

The initial Resource Block where data will be mapped in uplink.

The number of Resource Blocks reserved for the user in uplink.

All this control information shall be provided by the Processing Section through the local communications network.

The estimated bit rate between the Processing Section and a Remote Section would be as a maximum the bit rate corresponding to a 64QAM-modulated coded stream and full use of radio resources (i.e. all available channelization codes in UMTS, or 100 Resource Blocks in LTE). Given that the bit rate associated with the other control information is much lower (PDCCH, PBCH, PMCH, PHICH, and other common channels), this gives a maximum of roughly 90 Mbps for LTE, excluding other control information.

If radio resources are reused, it should be possible to assign the whole set of radio resources to more than one user. In this case, if N users are simultaneously assigned the same radio resources, each with 100 Resource Blocks and 64QAM, the total bit rate would be approximately 90×N Mbps.

In practice most scenarios will involve a much lower bit rate, because not all the radio resources are in general reserved for a single user.

Some embodiments of the invention are presented next:

One Processing Section and Many Remote Sections

This embodiment of the invention was shown in FIG. 1, where a Processing Section is connected to many Remote Sections by means of a local communications network. This embodiment of the invention is intended to provide very small coverage areas, supported by the Remote Sections, reducing the interference with the macrocell layer and with other femtonodes, and reusing the same radio resources in different Remote Sections.

Processing Section Integrated with Other Functionalities

Figure 7:
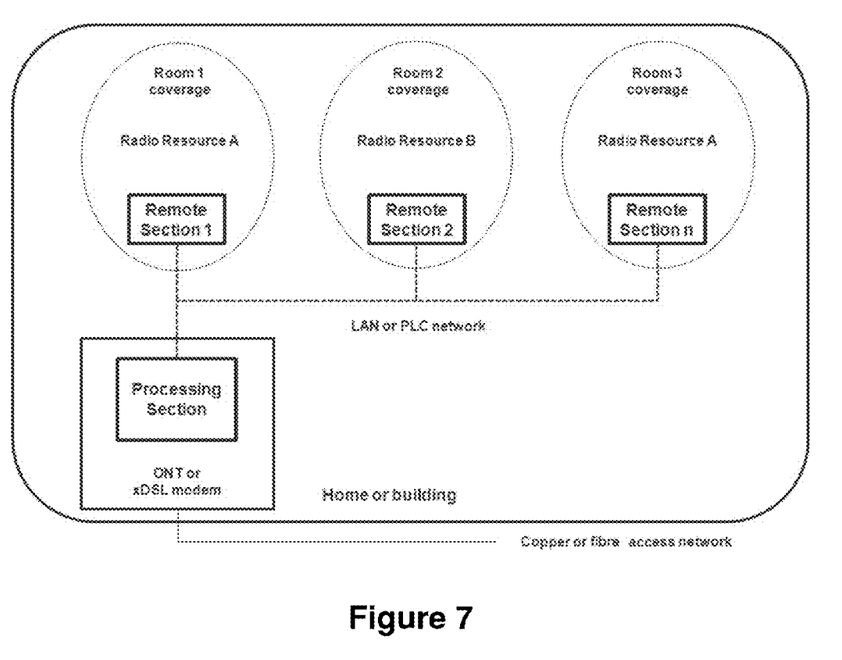
FIG. 7 shows, according to an embodiment of the system proposed in the invention, the processing section embedded within the ONT or the ADSL router.

This embodiment of the invention was shown in FIG. 7, where a Distributed Femtonode Processing Section is embedded within another equipment, typically but not precluding any other implementation, within an ONT or an ADSL modem. In this way, it is possible to have the Processing Section functionality and the ONT or modem functionality integrated within a single box, and at the same installing the Remote Section, or Remote Sections, in the most suitable location to provide indoor coverage.

Remote Sections with No Radio Radio Resources Reuse

In this embodiment of the invention all the Remote Sections radiate the same signal. In this way, the radio coverage of the femtonode is uniformly distributed through the area to be covered, avoiding coverage gaps and also avoiding areas of high radiated power which can interfere with the macrocell layer operation.

As all the Remote Sections radiate the same signal, the User Equipment mobility between different Remote Section coverage areas is ensured, because no handover procedure is needed, because the User Equipment does not perceive any difference between the signals from different Remote Sections.

Remote Sections with Radio Resources Reuse

In this embodiment of the invention the Remote Sections can radiate different signals. In this way, the radio coverage of the femtonode is uniformly distributed through the area to be covered, avoiding coverage gaps and also avoiding areas of high radiated power which can interfere with the macrocell layer operation. On the other hand, the radio resources (i.e. the occupation of a given piece of spectrum at a given time) can be reused between different Remote Sections, as far as there is no coverage gap between the Remote Sections which make use of the same radio resource.

In the particular case of LTE, the Remote Sections will radiate a set of two different radio channels:

1. Radio channels that are common to all the Remote Sections. These are the Primary Synchronization Channel, the Secondary Synchronization Channel, the Physical Broadcast Channel, the Physical Multicast Channel, the Physical Control Format Indicator Channel, and the Physical Hybrid Automatic Repeat Request Indicator Channel. The Remote Sections radiate the same common channels with no difference between them. However, the Cell Reference Signals in each Remote Unit should comprise different sets of subcarriers, according to the resources reserved for each of them; thus each UE will be able to extract the relevant channel information without interference from other Remote Units.

2. A radio channel that is specific to every Remote Section, the Physical Downlink Shared Channel. This physical channel transports the user data that is specific to every User Equipment. The LTE standard divides the radio resource in so called Resource Blocks, where every Resource Block comprises 12 subcarriers (180 KHz) during one slot time (0.5 ms). In this embodiment of the invention, an LTE Remote Section can use the same Resource Block that is being used by another LTE Remote Section, provided that their coverage areas do not overlap.

In order to reuse a Resource Block in different Remote Sections, the Processing Section must know which Remote Section is providing coverage to the User Equipment to deliver the needed Resource Block to that Remote Section. For this purpose, and not precluding any other possible implementation, the Processing Section can make use of the following procedures:

Forcing the User Equipment to send periodic uplink Sounding Reference Signals, as defined in 3GPP TS 36.211 [9], in specific time and spectrum intervals. The Sounding Reference Signals are detected by the Remote Section which is serving the user Equipment and sent to the Processing Section.

Analyzing the uplink ACK/NACK messages from the User Equipment, which are transported by means of the uplink Physical Uplink Common Control Channel. The ACK/NACK messages [10] are detected by the Remote Section which is serving the user Equipment and sent to the Processing Section.

Analyzing the uplink CQI (Channel Quality Indicator) [11] messages from the User Equipment, which are transported by means of the uplink Physical Uplink Common Control Channel. The CQI messages are detected by the Remote Section which is serving the user Equipment and sent to the Processing Section.

Analyzing the uplink Demodulation Reference Signals from the User Equipment, which are transported by means of the uplink Physical Uplink Common Control Channel and the Physical Uplink Shared Channel. The Demodulation Reference Signals are detected by the Remote Section which is serving the user Equipment and sent to the Processing Section.

In order to ensure the mobility of a User Equipment between Remote Sections, the Processing Section makes use of any of the procedures that has been described to detect the actual location of the User Equipment at any given instant. When the User Equipment moves from the coverage area of one Remote Section to that of another Remote Section, the Processing Section detects the Remote Section through which the uplink information (e.g. Sounding Reference Signals, ACK/NACK messages, CQI messages, Demodulation Reference Signals) from the User Equipment is being received, and thus determines the Remote Section that provides coverage to that User Equipment. Once the Processing Section determines which Remote Section receives the uplink data from the User Equipment, it will send in the downlink to that Remote Section the resource blocks of the Physical Downlink Shared Channel that are addressed to that specific User Equipment.

The advantages of this invention are as follows:

The chances that the coverage area of the distributed femtonode overlaps with that from other femtonodes are greatly reduced due to the low power emitted from every Remote Section. This reduces the overall level of interference detected by the femtonodes and by a User Equipment, increasing the capacity of the radio network.

The chances that the coverage area of the distributed femtonode overlaps with that from the macrocell layer are greatly reduced due to the low power emitted from every Remote Section. This reduces the overall level of interference detected by the femtonodes and by a User Equipment, increasing the capacity of the radio network. In particular, it reduces the level of interference detected by a User Equipment which is served by the macro layer and not connected to a nearby femtonode because not being authorized to be connected to it.

The radio resources can be re-used between different Remote Sections, as their coverage areas do not overlap, which can improve the capacity and the spectral efficiency of the femtonode.

When there is no User Equipment connected to a Remote Section, this Remote Section can radiate only the common radio channels and not the Physical Downlink Shared Channel, thus reducing the level of interference.

The interconnection between the Processing Section and the Remote Sections can be supported by a low performance Ethernet or PLC network, thanks to the requested low bit rate, as opposed to other solutions like CPRI or OBSAI which require bit rates in excess of 300 Mbps.

A person skilled in the art could introduce changes and modifications in the embodiments described without departing from the scope of the invention as it is defined in the attached claims.

ACRONYMS

3GPP 3rd Generation Partnership Project
ACK/NACK Acknowledge/Not Acknowledge message
ADC Analog to Digital Converter ADSL Asymmetric Digital Subscriber Line
CP Cyclic Prefix
CPRI Common Public Radio Interface
CQI Channel Quality Indicator
DAC Digital to Analog Converter
FFT Fast Fourier Transform
HNB Home Node B
HeNB Home evolved Node B
IFFT Inverse Fast Fourier Transform
LTE Long Term Evolution
LTE-A Long Term Evolution Advanced
OBSAI Open Base Station Architecture Interface
OFDM Orthogonal Frequency Division Multiplexing
OFDMA Orthogonal Frequency Division Multiple Access
ONT Optical Network Termination
PBCH Physical Broadcast Channel
PCFICH Physical Control Format Indicator Channel
PDCCH Physical Downlink Control Channel
PHICH Physical Hybrid ARQ Indicator Channel
PLC Power Line Communications
PRACH Physical Random Access Channel
P-SCH Primary Synchronization Channel
PUCCH Physical Uplink Control Channel
PUSCH Physical Uplink Shared Channel
QAM Quadrature Amplitude Modulation
QPSK Quadrature Phase Shift Keying
RS Reference Signals
SC-FDMA Single Carrier Frequency Division Multiple Access
S-SCH Secondary Synchronization Channel
UE User Equipment
UMTS Universal Mobile Telecommunication System

REFERENCES

[1] 3GPP TSG-RAN WG1 #62bis R1-105299, Considerations on Grouping based Interference Mitigation among Co-located Femtocells
[2] 3GPP TSG-RAN WG1 #62bis R1-105693, Enabling communication in harsh interference scenarios
[3] 3GPP TSG-RAN WG1 #62bis, R1-105746, On Macro-Femto interference handling
[4] 3GPP TR 36.922 LTE TDD Home eNodeB RF Requirements
[5] 3GPP TR23.830 Architecture aspects of Home NodeB and Home eNodeB
[6] 3GPP TS 25.367 Mobility procedures for Home Node B (HNB); Overall description; Stage 2 (Release 9)
[7] Common Public Radio Interface (CPRI); Interface Specification v4.2
[8] Open Base Station Architecture Initiative (OBSAI), BTS system reference document Version 2.0
[9] TS 36.211 Evolved Universal Terrestrial Radio Access (E-UTRA); Physical Channels and Modulation. Section. 5.5.3 Sounding reference signal.
[10] 3GPP TS 36.213, Evolved Universal Terrestrial Radio Access (E-UTRA); Physical layer procedures. 8.3 UE ACK/NACK procedure
[11] 3GPP TS 36.213, Evolved Universal Terrestrial Radio Access (E-UTRA); Physical layer procedures. 7.2UE procedure for reporting channel quality indication (CQI)

The invention claimed is:
1. A system for connecting radio access nodes of a radio access network, said radio access network comprising a plurality of radio access nodes, or cells, each of said cells providing a coverage area to a plurality of user equipments, each of said radio access nodes is split into:
a common processing section configured to perform a main processing stage; and
a plurality of remote transceiving sections, each configured to perform a local processing stage complementing said main processing stage, being operatively connected to said common processing section, wherein each remote transceiving section of said plurality of remote transceiving sections is configured to provide radio coverage in a sub-area of said coverage area, and constitutes a sub-cell of said cell, wherein said coverage area is distributed into said coverage sub-areas, wherein
said common processing section is configured to perform data processing functionalities between a radio resource control layer and a modulation mapper of a physical layer, said common processing section comprising the following processing blocks in a communication direction between the common processing section and the remote transceiving section: a code block segmentation, a channel coding, a rate matching, a code block concatenation, a circular buffer, a scrambling and a pre-modulation mapper;
wherein said pre-modulation mapper block is configured to add the following information to a data stream:
a type of modulation to be applied in said remote transceiving section; and
a number of radio resources reserved to a user equipment;
wherein said radio resources are resources blocks, and said pre-modulation mapper block is further configured to add an initial resource block where data will be mapped at said remote transceiving section to data stream, so that an output constitutes a lower data rate than an output of a common complex-modulated modulator; and
wherein said plurality of remote transceiving sections include the following blocks in the communication direction between the remote transceiving section and the common processing section: a quadrature (IQ) demodulation, a downconversion, an analog to digital conversion, a cyclic prefix removal, a Fast Fourier Transform (FFT) and Inverse Fast Fourier Transform (IFFT) processing, a resource element demapper and a demodulation demapper.
2. The system according to claim 1, wherein said common processing section and said remote transceiving sections are connected by a low bit rate communications network.
3. The system according to claim 1, wherein said radio access network is a Long Term Evolution (LTE) or Universal Mobile Telecommunication System (UMTS) radio access network.
4. The system according to claim 1, wherein said common processing section is further configured to make use of as many data streams as user equipments and devote every data stream to one of said remote sections.
5. The system according to claim 1, wherein said radio access nodes are femtonodes.
6. A method for connecting radio access nodes of a radio access network, said radio access network comprising a plurality of radio access nodes, or cells, each of said cells providing a coverage area to a plurality of user equipments, the method comprising splitting each of said radio access nodes into:
a common processing section configured to perform a main processing stage; and
a plurality of remote transceiving sections, each configured to perform a local processing stage complement- ing said main processing stage, wherein each remote transceiving section of said plurality of remote transceiving sections is configured to provide radio coverage in a sub-area of said coverage area, and constitutes a sub-cell of said cell, wherein said coverage area is distributed into said coverage sub-areas, wherein the method further comprises:
performing, by said common processing section, data processing functionalities between a radio resource control layer and a modulation mapper of a physical layer, said common processing section comprising the following processing blocks in a communication direction between the common processing section and the remote transceiving section: a code block segmentation, a channel coding, a rate matching, a code block concatenation, a circular buffer, a scrambling and a pre-modulation mapper;
adding, by said pre-modulation mapper block, the following information to data stream:
a type of modulation to be applied in said remote transceiving section; and
a number of radio resources reserved to a user equipment;
further adding, by said pre-modulation mapper block, an initial resource block where data will be mapped at said remote transceiving section to data stream, so that an output constitutes a lower data rate than an output of a common complex-modulated modulator; and
obtaining a lower data rate after a downconversion process than an output of a common analog to digital converted at an output of a demodulation demapper, said demodulation demapper being one of the blocks included in the communication direction between the remote transceiving section and the common processing section of said plurality of remote transceiving sections.

* * * * *